United States Patent [19]

Salter

[11] Patent Number: 5,682,605
[45] Date of Patent: Oct. 28, 1997

[54] WIRELESS COMMUNICATION SYSTEM

[75] Inventor: Gary C. Salter, Mississauga, Canada

[73] Assignee: 989008 Ontario Inc., Mississauga, Canada

[21] Appl. No.: 340,338

[22] Filed: Nov. 14, 1994

[51] Int. Cl.$^6$ .................. H04B 1/00; H04B 7/00
[52] U.S. Cl. .............. 455/54.1; 455/51.1; 375/200; 375/206; 379/58
[58] Field of Search .................. 375/200, 202, 375/206; 379/58; 370/18; 327/164; 455/33.1, 51.1, 54.1

[56] References Cited

U.S. PATENT DOCUMENTS

| | | | |
|---|---|---|---|
| 4,672,658 | 6/1987 | Kavehrad et al. | 379/63 |
| 4,785,463 | 11/1988 | Jane et al. | 375/206 |
| 4,912,722 | 3/1990 | Carlin | 375/1 |
| 4,977,577 | 12/1990 | Arthur et al. | 375/1 |
| 5,016,255 | 5/1991 | Dixon et al. | 375/1 |
| 5,150,377 | 9/1992 | Vannucci | 375/1 |
| 5,488,631 | 1/1996 | Gold et al. | 375/206 |
| 5,515,396 | 5/1996 | Dalekotzin | 375/206 |

*Primary Examiner*—Wellington Chin
*Assistant Examiner*—Jean B. Corrielus
*Attorney, Agent, or Firm*—Bereskin & Parr

[57] ABSTRACT

A wireless digital communication system for sending and receiving digital information as receive and transmit packets which are interleaved in time to provide pulsed duplex communication between a transmitter and a receiver. The transmitter comprises a generator for generating a pseudo-random signal and a modulator for modulating the pseudo-random signal with information to be transmitted and a RF transmitter for transmitting the modulated information signal. The modulator produces a packet having a start bit which corresponds to a preselected bit position in the pseudo-random signal. The bit position provides a means for encoding the packet and is defined according to a code stored in memory. The receiver includes a RF receiver for receiving the modulated packet, a generator for generating a pseudo-random signal which matches that generated by the transmitter, and a demodulator for demodulating the received packet. The demodulator uses the pseudo-random signal to extract the information originally encoded in the packet. The system includes another link for passing the code between the receiver and transmitter. The communication channel provides pulsed duplex operation by interleaving in time receive and transmit packets.

8 Claims, 10 Drawing Sheets

CLOCK GENERATOR AND RECOVERY CIRCUIT

WIRELESS COMMUNICATION SYSTEM

FIELD OF THE INVENTION

The present invention relates to a wireless or radio communication system, and more particularly to a cordless digital telephone system.

BACKGROUND OF THE INVENTION

Consumer cordless telephone sets use a radio link for communicating between the handset and base unit thereby eliminating the handset cord and providing the user with added mobility. The majority of cordless phones utilize analog technology and are designed for use on the 46 and 49 MHz communication bands.

More recently, consumer cordless phones utilizing digital communication technology have become known in the art. The digital cordless phones are typically designed to operate in the 902 to 928 MHz communication band range.

The digital cordless phones differ from conventional analog telephone sets based on how information is transmitted. In a digital cordless phone, information is encoded and transmitted as bits, i.e. ones and zeroes.

In the wireless digital communication art, spread spectrum signals are one method for transmitting digital information. A spread spectrum signal, such as Code Division Multiple Access or CDMA, is characterized by a bandwidth which is much greater than the information rate, i.e. bits per second. Spread spectrum signals are suited for communication systems because they can support multiple access protocols as will be appreciated by those skilled in the art.

Known multiple access techniques for spread spectrum signals include Code Division Multiple Access or CDMA. In addition, narrowband spectrum signals, such as Frequency Division Multiple Access or FDMA, and Time Division Multiple Access or TDMA are suitable for multiple access techniques in digital communication systems.

Code Division Multiple Access or CDMA systems are further classified into frequency hopping and direct sequence systems. In direct sequence CDMA systems, multiple channels share the same frequency and time. The multiple channels are distinguished from one another by superimposing a different pseudo-random pattern, known as a PN code, for each channel. Direct sequence CDMA signalling is commonly used in continuous mode for communication systems. Frequency hopping systems, on the other hand, are typically used in pulse mode communication systems according to the art.

While known digital cordless phones can provide good performance and reliability, they tend to be expensive because of the design complexity. As will be understood by one skilled in the art, clock recovery and receiver synchronization are two of the most important operating aspects of a digital communication system. For example, in a Direct Sequence CDMA based system, the PN sequence generated at the receiver, e.g. the handset, must be synchronized with the PN sequence embedded in the incoming digital signal transmitted by the base unit, otherwise the incoming digital signal cannot be demodulated. Conventional clock recovery technique involves using a digital or analog phase locked loop (PLL). The PLL "locks" onto an incoming digital signal to produce a matched or recovered clock signal. In a pulsed system, clock recovery becomes even more difficult because the PLL must acquire and lock on every packet before the data can be received reliably which further increases the cost of the cordless unit. This requires a PLL with a fast acquisition and lock time which can be costly. Additionally for PLL based systems, the digital data stream or packet must contain a preamble of sufficient length to allow the PLL in the receiving unit to recover the clock before the data portion of the packet arrives. In practical terms this means that terminal considerations can constrain the signalling protocol. (The preamble typically comprises a sequence of pulses or data at the start of a data packet or string.)

Therefore, there is a need for a digital cordless phones which can compete with conventional analog cordless sets while providing performance comparable to the more expensive known digital cordless phones.

BRIEF SUMMARY OF THE INVENTION

The present invention provides a wireless system for two-way communication using digital signalling. The system features a pn code which provides the receiving and transmitting units with a modulated communication signal that includes security encoding. According to the invention, security is provided by scrolling the pn code so that the bit position of the pn code sequence which becomes the start bit in the transmit packet varies according to the security code. The start bit position is a security code which is shared by matching receiving and transmitting units.

The present invention also features a novel clock recovery circuit by which the receiving unit reconstructs the digital clock of the transmitting unit. The clock recovery circuit comprises a pulse shape detector which looks for a predetermined pulse shape in the incoming data stream. The clock recovery circuit according to the invention is less susceptible to noise in the data stream and can lock on the first detected pulse shape.

The present invention also features novel error detection and correction features which utilize a digital averaging technique to detect and correct errors in the transmitted digital data.

According to the invention, filtering is performed after detection of a signal. Because filtering is done after detection, correlation in the receiving unit is not necessary and therefore the complexity of the Radio Frequency (RF) circuitry can be reduced.

The present invention also comprises a transmission mode which features pulsed time division duplex communication combined with direct sequence CDMA or Code Division Multiple Access communication. The transmission mode according to the present invention allows the interleaving of the transmit and receive channels.

In a first aspect, the present provides an apparatus for wireless digital communication, said apparatus comprising: (a) input means for inputting an information signal; (b) means for generating a pseudo-random signal; (c) means for combining said information signal with said pseudo-random signal to produce a packet, said packet having a start bit and said start bit being defined by a preselected bit position in said pseudo-random signal; and (d) transmitter means for transmitting said packet and said transmitter means being operational for a transmitting interval.

In another aspect, the present invention provides an apparatus for wireless communication of digital information, said apparatus comprising: (a) receiver means for receiving a packet comprising an information signal combined with a pseudo-random signal and said packet having a start bit and said start bit being defined by a preselected bit position in said pseudo-random signal; (b) means responsive to a code for determining said preselected bit position in said pseudo-random signal and producing a demodulating control signal; (c) means for recovering said information signal from said packet, said means for recovering having means responsive to said demodulating control signal for separating said pseudo-random signal from said information signal to produce an original information signal; and (d) said receiver means including means for receiving said code from an external source.

In yet another aspect, the present invention provides a method for wireless communication comprising the steps of: (a) inputting an information signal; (b) generating a pseudo-random signal; (c) combining said information signal with said pseudo-random signal to produce a packet, said packet having a start bit defined by a preselected bit position in said pseudo-random signal; (d) providing a code for determining said preselected bit position in pseudo-random signal; and (e) transmitting said packet during a transmit interval.

BRIEF DESCRIPTION OF THE DRAWINGS

For a better understanding of the present invention, and to show more clearly how it may be carried into effect, reference will now be made, by way of example, to preferred embodiments of the present invention shown the accompanying drawings in which.

DETAILED DESCRIPTION OF THE PREFERRED EMBODIMENTS

Figure 1:
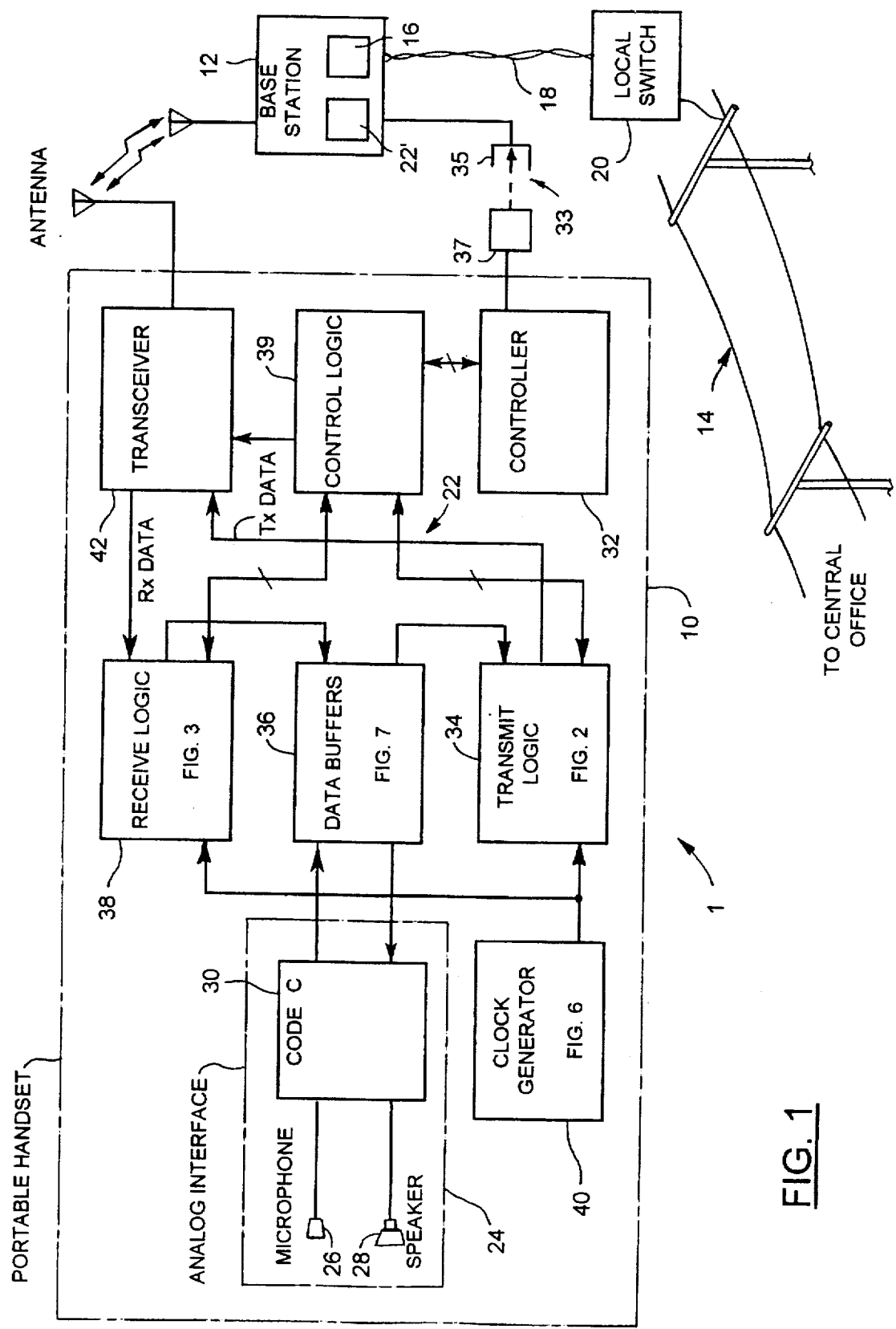
FIG. 1 is a block diagram showing a wireless communication system according to the present invention.

Reference is first made to FIG. 1 which shows in block diagram form a two-way wireless digital communication system 10 according to the present invention. In the following description, the wireless communication system 1 is described in the context of a digital cordless telephone. It will however be understood that the communication system according to the present invention can be applied to other applications which require two-way communication of digital data. For example, the system 10 according to the present invention is suitable for a wireless modem communication system.

The wireless communication system 1 shown in FIG. 1 provides "two-way" wireless communication between communicating units. In a cordless telephone application, the usual telephone functions are performed over a radio link, thereby eliminating the handset cord and providing the user with added mobility. The communicating units comprise a portable handset 10 (i.e. Unit A) and a base station 12 (i.e. Unit B). The base station 12 couples the handset 10 to a telephone network 14 or other type of larger communications network. The base station 12 includes an interface circuit 16 which is compatible with the network 14. For example, in a conventional telephone network 14, the interface circuit 16 couples the base station 12 to the network 14 through a subscriber loop 18 and local switch 20 as will be understood by one skilled in telephony.

As shown in FIG. 1, the digital handset 10 according to the present invention comprises a digital circuit 22 and an analog interface 24. The analog interface 24 provides the "front-end" for two-way voice communication. (In applications where the information is digital, the analog interface 24 will not be needed.) In a telephony application, the analog interface 24 comprises a microphone 26, a speaker 28, and a PCM CODEC Filter chip 30. The CODEC 30 is a known device which "codes" analog signals received from the microphone 26 into digital signals, and "decodes" digital signals into analog signals for the speaker 28. The digital signals originating from the microphone 26 represent transmit data, and the digital signals destined for the speaker 28 represent receive data. For an "8-bit" CODEC with a nominal sample rate of 8 KHz, the serial data rate is 64 Kbits/second (Kb/s). The digital circuit 22 includes a controller 32 which oversees the operation of the circuit 22 to provide two-way communication. The controller 32 comprises a suitably programmed microcontroller preferably a single package 8-bit microcontroller which includes "on-chip" resources such as input/output ports, timers, random access memory (RAM) and program memory (ROM).

As shown in FIG. 1, the base station 12 also includes a digital circuit 22' which is like the circuit 22 in the handset 10. The digital circuit 22' is coupled to the interface circuit 16, i.e. telephone network 14 on one side, and the transceiver of the handset 10 on the other side.

A feature of the present invention is the use of digital packets which are interleaved in time for the transmit and receive directions between the handset 10 and base station 12. According to the invention, the digital packets are encoded using Code Division Multiple Access (CDMA) techniques and interleaved using Time Division Multiple Access (TDMA) to produce a full duplex broadband system. (In another embodiment, the present invention can be modified for one-way communication, e.g. a security system which only transmits packets.)

In operation, information, e.g. digitized voice, is transmitted in the form of a synchronized pulse transmission at radio frequency. According to the invention, the handset 10 and base station 12 alternate in time between transmit and receive modes with the transmit and receive intervals or "windows" being separated by a switching period. As shown in the timing diagram in FIG. 8(a), the transmit window for the handset 10 (i.e. Unit A) is indicated by interval 101 on TX ENABLE 100 and the receive window is indicated by interval 103 on RX ENABLE 102. A switching interval 104 separates the transmit interval 101 and the receive interval 103 for the handset 10. The switching interval 104 provides a period for the receive and transmit stages of the circuit 22 to settle and allows the controller 32 to do any required processing or control operations.

Figure 8A:
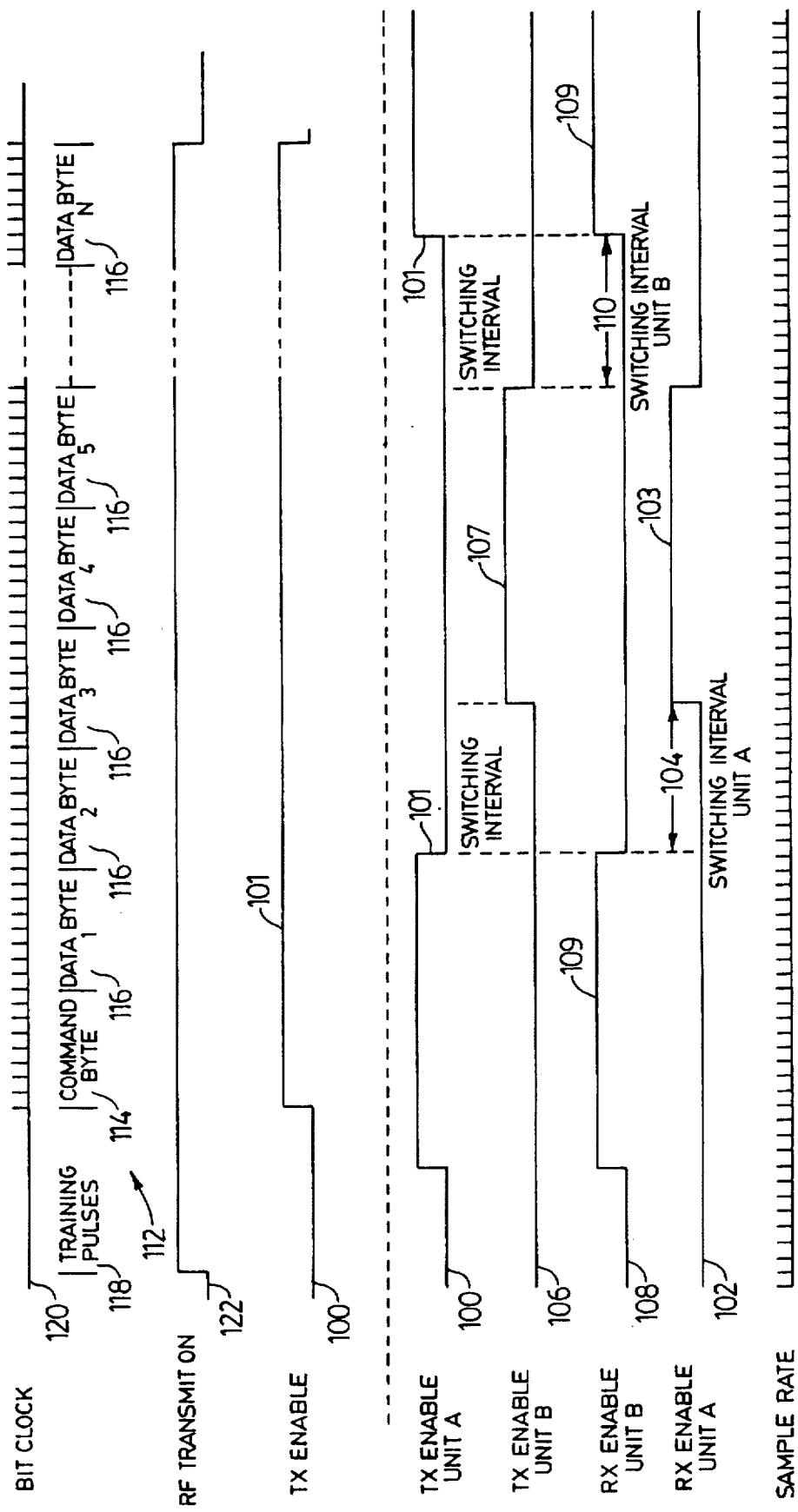
FIGS. 8(a) and 8(b) are waveform diagrams showing various signal waveforms which are generated by the system shown in FIG. 1.

Referring still to FIG. 8(a), the transmit interval or "window" for the base station 12 (i.e. Unit B) is indicated by interval 107 on TX ENABLE 106 and the receive window is indicated by interval 109 on RX ENABLE 108. A switching interval 110 also separates the transmit and receive intervals 107,109 for the base station 12. As can be seen in FIG. 8(a), the handset 10 and base unit 12 alternate in time between receive and transmit mode, that is, if the handset 10 is in transmit mode 101, then the base station 12 is in receive mode 109, and vice versa. By alternating between receive and transmit, the handset 10 and base unit 12 provide time division duplex operation.

It is another feature of the invention that each pulse transmission in the transmit intervals 101,107 and the receive intervals 103,109, comprises an encoded packet 112. As shown in FIG. 8(a) each packet 112 has a command byte 114 and "n" bytes of data 116. The command byte 114 contains an instruction or status request which directs the circuit 22 (and controller 32) to perform a specific task, for example, ring handset 10. The data bytes 116, on the other hand, provide information. For example in the context of a cordless phone, the data bytes 116 comprise digitized voice samples. The data bytes 116 can also include alphanumeric text and other types of data to support more advanced telephony features, for example, caller's name display or data file downloading.

As shown in FIG. 8(a), each packet 112, i.e. command byte 114 and data bytes 116, is preceded by a training pulse segment or burst 118. The training pulse segment 118 is a momentary burst of pulses which are used by the receiving unit, e.g. handset 10, to synchronize the circuit 22 in the receiving unit, e.g. handset 10, to the incoming data stream comprising the packet 112. The command and data bytes 114,116 comprise a stream of digital bits which are synchronized to a bit clock 120. As will be described below, the bit clock 120 is generated by the circuit 22 (and circuit 22'). To achieve accurate digital communication, the bit clock 120 in the receiving unit, e.g. handset 10, must be synchronized to the corresponding bit clock (not shown) in the transmitting unit, e.g. base station 12.

As shown in FIG. 8(a), a packet 112 which is transmitted by the handset 10 is framed by the transmit interval 101 and the rising edge of the TX ENABLE 100 defines the start of the packet 112 which begins with the command byte 114. Similarly, a packet which is transmitted by the base station 12 is framed by the transmit interval 107 and the rising edge of TX ENABLE 106 defines the start of the packet.

To preserve all the data in a synchronized pulse transmission, the rate of data transmission during the transmit interval 101,103 or receive interval 103,109 must equal the average data rate divided by the duty cycle of the synchronized pulse transmission as will be understood by one skilled in the art. For example, for an average data rate of 64 Kbits per second (i.e. synchronous voice) and a transmission duty cycle of 30%, the transmit data rate must be 213 kb/s.

Referring back to FIG. 1, the digital circuit 22 couples to the analog interface 24 or front-end. As shown in FIG. 1, the digital circuit 22 comprises a transmit logic stage 34, a data buffer stage 36, a receive logic stage 38, a clock generator 40, and a transceiver stage 42. As shown in FIG. 1, the digital circuit 22 also includes a control logic block indicated by reference 39. The control logic 39 couples the controller 32 to the transmit logic 34, the receive logic 38, and the transceiver 42 and provides an interface for controlling and overseeing the operation of the various logic blocks.

As shown in FIG. 1, the communication system 1 according to the invention also includes another link 33 between the handset 10 and the base station 12. The link is used to pass a security code (described in detail below) between the handset 10 and the base station 12. The link 33 comprises an output 35 from the base station 12 which couples to an input 37 on the controller 32 in the handset 10. In the preferred embodiment, the link 33 is formed by a contact located on the handset 12 (shown as input 37 in FIG. 1) and a corresponding contact (indicated by reference 35 in FIG. 1) located in a cradle (not shown) in the base station 12. When the user places the handset 10 in the cradle, electrical contact is made between the output 35 and the input 35 and the controller 32 inputs or reads the current security code from the base station 12. This allows the security code to be automatically and continuously updated thereby reducing the likelihood of two similar systems 1, e.g. phones, inadvertently communicating with each other and provides a "lock-out" feature. (In another embodiment, the security code can be set manually, for example using a switch in the handset 10 and another switch in the base station 12.) The security code is used to decode and encode information which is sent between the handset 10 and the base station 12 as described in more detail below.

The function of the data buffer stage 36 is to "buffer" data both in the transmit and receive directions. In the transmit direction, the data buffer stage 36 stores digitized voice data produced by the CODEC 30 until required by the transmit logic stage 34. The digitized voice data produced by the CODEC 30 represents the speech produced by the microphone 26. In the receive direction, the data buffer stage 36 stores data from the receive logic stage 38 for input to the CODEC 30. The CODEC 30 in known manner converts the receive data into analog signals which energize the speaker 28 to reproduce the voice of the calling party, and thereby provide two-way communication. (The start of TX ENABLE 100 is synchronized to the sampling rate of the CODEC 30.)

Figure 7:
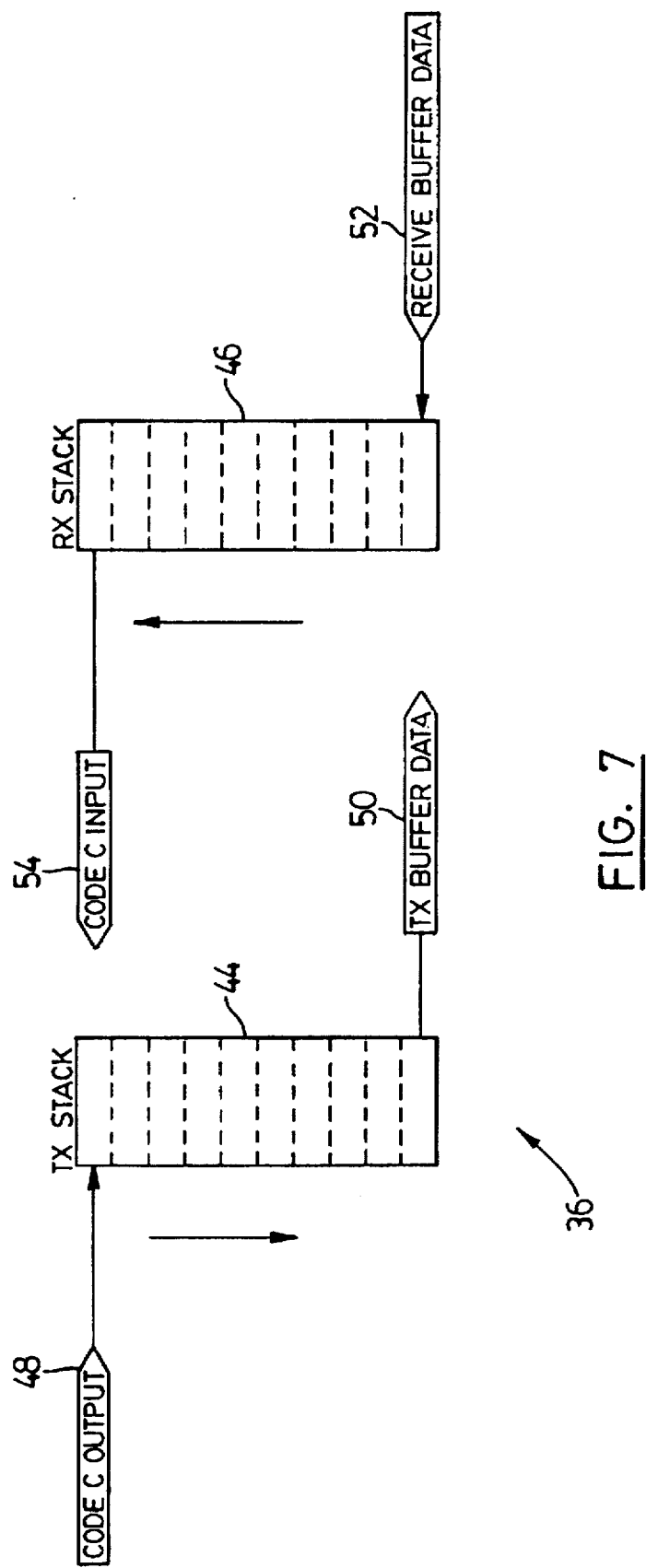
FIG. 7 is a schematic diagram showing in more detail the data buffer block of FIG. 1.

Reference is next made to FIG. 7 which shows the data buffer stage 36 in more detail. As shown in FIG. 7, the data buffer stage 36 comprises a transmit stack 44 and a receive stack 46. The transmit stack 44 and the receive stack 46 are implemented in RAM (e.g. on-chip or external RAM) which is accessed by the controller 32 (FIG. 1) under program control. The transmit stack 44 and the receive stack 46 can also be implemented in hardware, for example, by utilizing FIFO (First-In-First-Out) dual port memory chips. The transmit stack 44 buffers or stores digitized voice data which is received from an output 48 on the CODEC 30 so that the digitized data can be clocked out at the higher rate for the circuit 22 as determined by the bit clock 120 (FIG. 8(a)). The receive stack 46 stores data received from the receive stage 38 at the higher rate of the bit clock 120 and outputs the data to input port 54 on the CODEC 30 at the slower rate of the CODEC 30.

Figure 2:
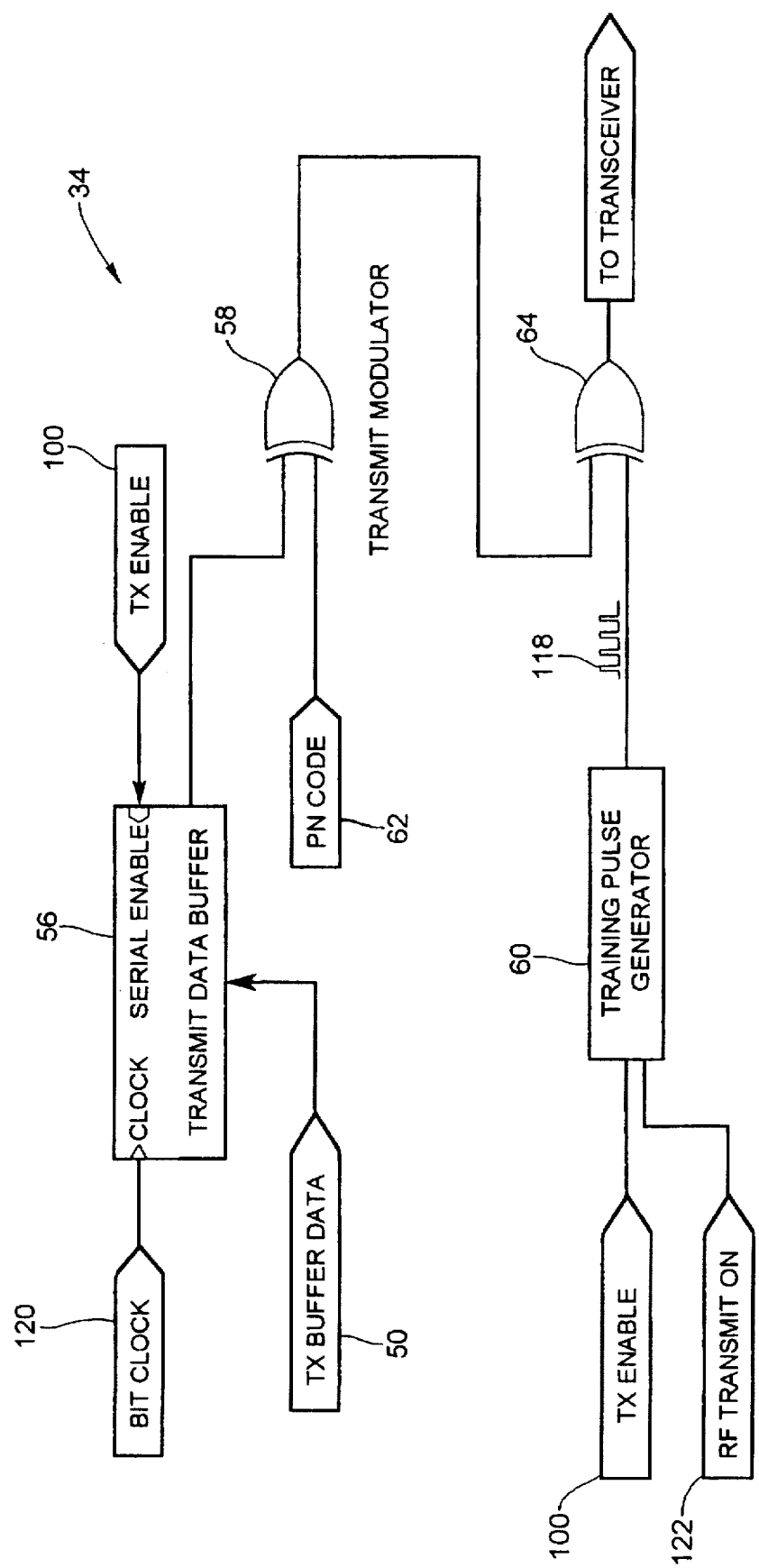
FIG. 2 is a schematic diagram showing in more detail the transmit logic block for the system of FIG. 1.

Reference is next made to FIG. 2 which shows the transmit stage 34 in more detail. The transmit stage 34 comprises a transmit data buffer 56, a transmit modulator 58, and a training pulse generator 60. The transmit data buffer 56 comprises a parallel-to-serial shift register. The parallel input of the transmit data buffer 56 receives transmit buffer data 50 from the transmit stack 44. The serial output of the transmit data buffer 56 is connected to one input of the transmit modulator 58. The transmit data 50 is clocked or shifted out of the buffer 56 at a data rate which is equal to the bit clock 120. The loading of the transmit data buffer 56 is enabled by the TX ENABLE signal 100. The bit clock 120 is generated by the clock generator 40 (FIG. 1) and the TX ENABLE signal 100 is generated by the controller 32 and synchronized to the sampling frequency of the CODEC 30, for example, using a status output line (not shown). It will be remembered that the TX ENABLE signal 100 is a control signal which is active for the duration of a packet 112. By synchronizing the TX ENABLE signal 100 with the CODEC 30, synchronization is maintained between the receive logic 38 and the transmit logic 34.

Figure 3:
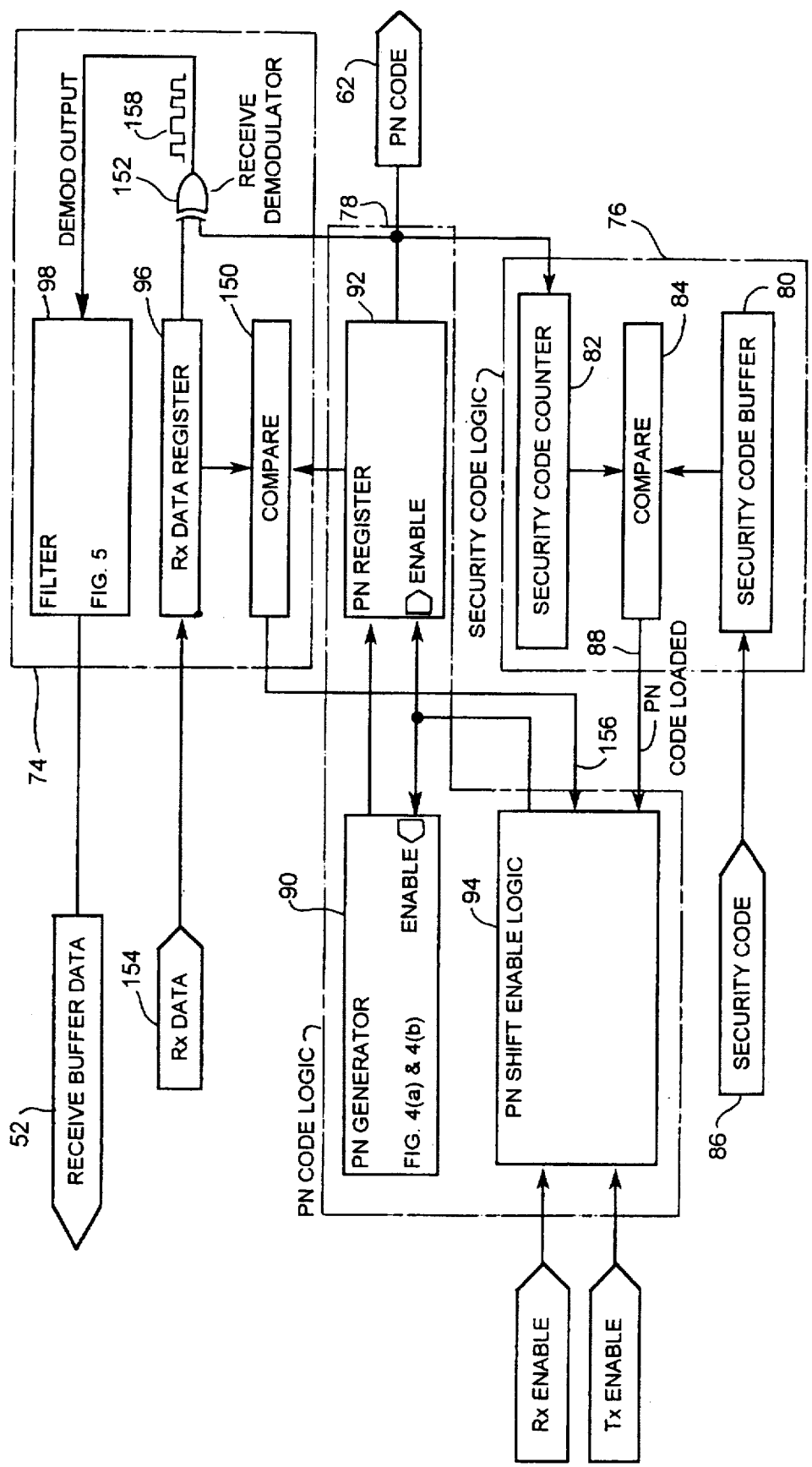
FIG. 3 is a schematic diagram showing in more detail the receive logic block for the system of FIG. 1.

Referring still to FIG. 2, the transmit modulator 58 comprises an exclusive OR (XOR) logic gate having one input connected to the output from the transmit data buffer 56 and the other input connected to a PN code output 62 from a PN register (FIG. 3). The PN code is a pseudo-random digital sequence which is produced by a PN generator as will be described below with reference to FIGS. 4(a) and 4(b). The transmit modulator 58 combines the output from the transmit data buffer 56 with the pn code 62 to encode the data comprising the transmit packet 112. To decode the packet 112, the receiving unit, i.e. base unit 12, must match and thereby strip the pn code from the received data packet. The operation of the receive stage 38 is described in more detail below.

As shown in FIG. 2, the output from the transmit modulator 58 forms an input to another XOR gate 64. The burst of training pulses 118 produced by the training pulse generator 60 provides the other input to the XOR gate 64. The XOR gate 64 inserts the burst of training pulses 118 at the beginning of the modulated transmit data packet 112. The burst of training pulses 118 provides a pulse train which the receiving unit, e.g. base unit 12, uses to synchronize its clock in advance of the start of the transmit data packet 112, i.e. the rising edge of the TX ENABLE signal 100. Preferably, the rate of the training pulses 118 is synchronized to the rate of the pn code 62. The training pulse generator 60 is controlled by the TX ENABLE signal 100 and the RF TRANSMIT ON signal 122 which define the duration of the training pulses 118 as shown in FIG. 8(a).

Figure 9:
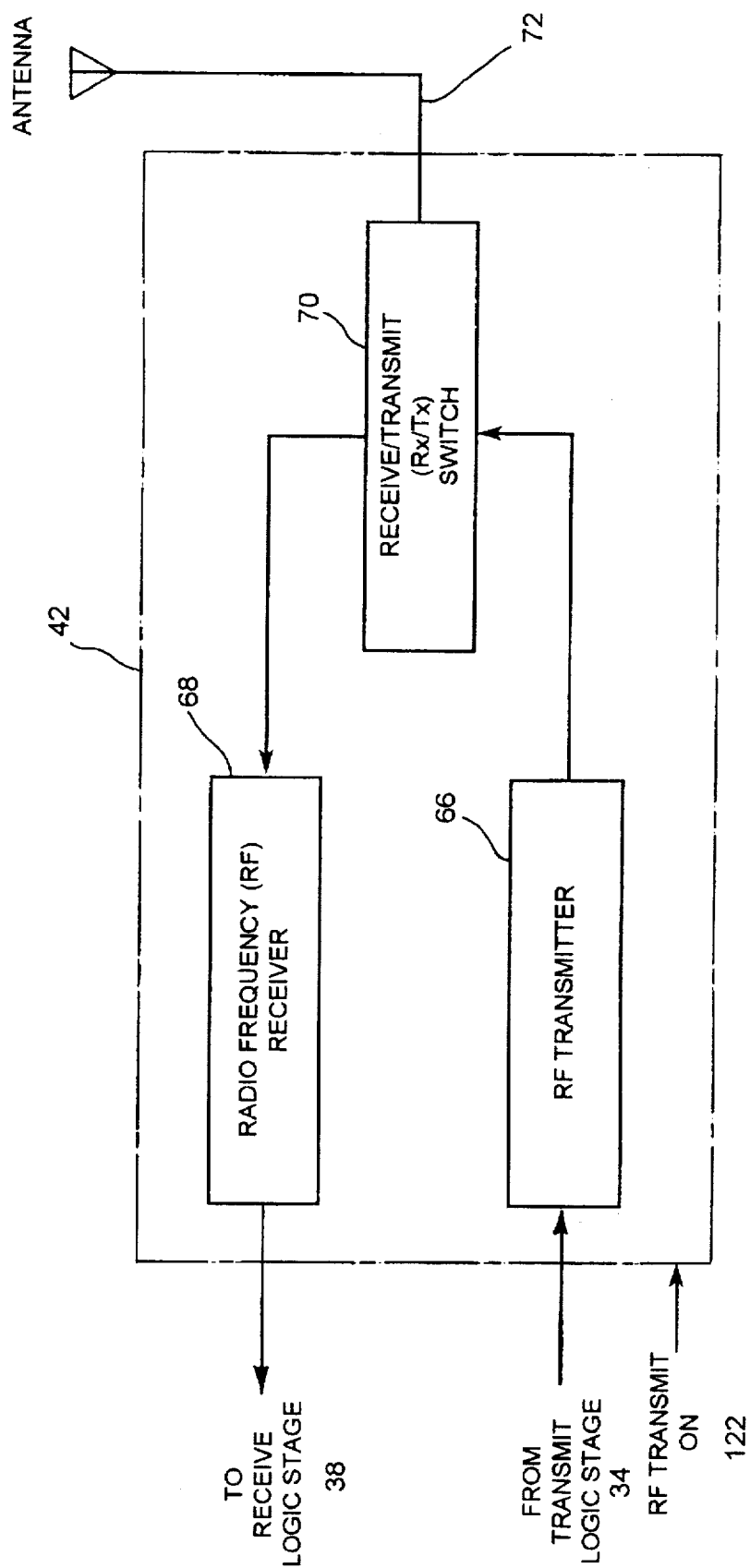
FIG. 9 is a block diagram showing in more detail the transceiver of FIG. 1.

The output from the second XOR gate 64 comprising the packet 112 and training pulse burst 118 provides an input for the transceiver stage 42 (FIG. 1). As shown in FIG. 9, the transceiver stage 42 comprises a Radio Frequency (RF) transmitter 66, a RF receiver 68, a transmit/receive (RX/TX) switch 70, and an antenna 72. Preferably, the RF transmitter 66 and receiver 68 have a bandwidth of 2 MegaHertz. The transmitter 66 (and receiver 68) can use known modulation techniques such as frequency modulation (FM) or amplitude modulation (AM). In the preferred embodiment, the signal is modulated using Frequency Shift Keying (FSK) and the transceiver stage 42 can be implemented as will be understood by one skilled in the art. It will be appreciated that since the communication system according to the present invention is of a "pulsed" nature, a conventional duplexor (not shown) can be replaced by the less expensive RX/TX switch 70, thereby further reducing cost of the digital communication system. Preferably, the transceiver stage 42 is implemented for a 902 to 928 MHz communication band.

Reference is next made to FIG. 3 which shows the receive logic stage 38 in more detail. The receive logic stage 38 comprises three functional blocks: a receive data circuit 74, security code logic 76 and pn code logic 78. The principal function of the receive data circuit 74 is to demodulate the receive data or RX DATA 154 which is received from the transceiver 42. The receive data circuit 74 also filters the RX DATA 154 to reduce the effects of noise. The function of the security code logic 76 is to decode a security code which is common to the handset 10 and the base unit 12 and allows communication between the receiving and transmitting units 10,12. The pn code logic 78 works in conjunction with the security code logic 76 to link the handset 10 and the base unit 12 based on a matching security code. It is a feature of the present invention that the security code is embedded as part of the start bit position in the pn code.

As shown in FIG. 3, the security code logic 76 comprises a security code buffer 80, a security code counter 82 and a compare register 84. The security code counter 82 is a ring counter which produces a sequential count output. The security code buffer 80 is loaded with a predefined security code 86. The compare register 84 "compares" the loaded security code 86 to the count output of the counter 82 and if they are the same, the register 84 produces a PN CODE LOAD signal on output 88. As will be described below, the PN CODE LOAD signal is used by the pn logic 78 to generate a corresponding pn code 62.

The security code 86 is preferably stored in memory (not shown) which is accessed by the controller 32' in the base station 12. The security code 86 is passed to the controller 32 through the contacts 35,37 shown in FIG. 1. In the preferred embodiment of the present invention, there are 256 security codes 86 which are available for use. However, the number of security codes 86 can be expanded by increasing the length of the security code 86, e.g. from 8 bits to 10 bits. In another embodiment, the security code 86 can be set using a switch (not shown) which is located in the base station 12 and another corresponding switch (not shown) which is located in the handset 10 and set with the same code, for example at the time the unit is assembled.

As shown in FIG. 3, the output 88 of the compare register 84 is coupled to the pn code logic 78. The function of the pn code logic 78 is to produce the pn code 62. The pn code logic 78 comprises a pn generator 90, a pn register 92 and pn shift enable logic 94.

In known continuous mode cordless phones, the security code is passed between the handset and base station prior to voice communication in order to couple the receive and transmit units. In the present invention, the security code 86 is embedded in the pulse packet 112 (FIG. 8(a)) as part of the start bit position which is defined by the rising edge of TX ENABLE 100 or 106 (FIG. 8(a)). According to the invention, the packet 112 is encoded through modulation with the pn code 62 and the pn code 62 is pseudo-random digital sequence which is generated by the pn code logic 78. Since decoding of the packet 112 depends on the receiver 38 matching the pn code 62, then according to the invention the effective pn code can be changed by varying the bit in the pn sequence that corresponds to start bit position in the packet 112. For the security code logic 76 shown in FIG. 3, this is done through the security code 86. The security code 86 provides a variable count which is compared to the output of the security code counter 82. When the output of the counter 82 matches the security code 86, the compare register 84 produces a PN CODE LOAD signal 88 which loads the PN code 62 from the pn generator 90 into the pn register 92 and thereby produces the PN code 62 output. Furthermore, by embedding the PN code in all exchanges of information, i.e. packets, between the handset 10 and the base station 12, incomplete messages which can lead to false operations, e.g. hook switch signal or ringing in conventional cordless phones are eliminated.

Referring still to FIG. 3, the receive data circuit 74 comprises a RX data register 96, a RX data filter 98, a RX data compare register 150 and a RX data demodulator 152. As shown, the RX data register 96 has an input for a RX data stream 154 and an output which provides one of the inputs to the RX demodulator 152. The RX data register 96 is also coupled to the RX compare register 150. The RX compare register 150 compares the pn code portion in RX data stream 154 to the pn code 62 which has been loaded in the PN register 92. When there is a match between the embedded pn code in the RX data stream 154 and the PN code 62 stored in the register 92, the RX compare register 150 produces a PN shift enable output signal 156 which starts the PN generator 90 to generate the PN code 62. In the preferred embodiment, the RX compare register 150 produces the PN shift enable output signal 154 for a match of any 14 bits in the PN code 62 contained within the 16 bit PN register 92 and the RX data stream 154. This provides reliable triggering to occur with up to 2 error bits present.

It will be appreciated that according to the present invention, the PN code 62 secures the transmission path between the handset 10 and the base unit 12. Security is provided by scrolling the PN code 62 so that a bit position in the PN code 62 sequence defines the start bit in the packet 112 and the bit position is defined by the security code 86. The security code 86 is shared by matching a handset 10 and base unit 12, thereby preventing access between "unmatched" units, i.e. "locking-out" another unit.

Referring back to FIG. 3, the PN code signal 62 provides the other input to the RX data modulator 152. Thus, once the PN generator 90 is started, the RX data demodulator 152 is presented synchronously with the PN code 62 on one input and the RX data stream (and embedded PN code) 154 on the other input. Through the XOR logic operation of the demodulator 152, the PN code embedded in the RX data stream 154 is "stripped" and the demodulator 152 produces a demodulated data output 156 comprising a stream of receive data bits. It will be appreciated that the data output 156 may contain error bits, for example due to electrical noise. To alleviate the effects of noise, the demodulated data output 156 is fed into the RX data filter 98. The RX data filter 98 is described below with reference to FIG. 5. It will also be appreciated that error bits may also be present in the received modulator output.

Figure 4A:
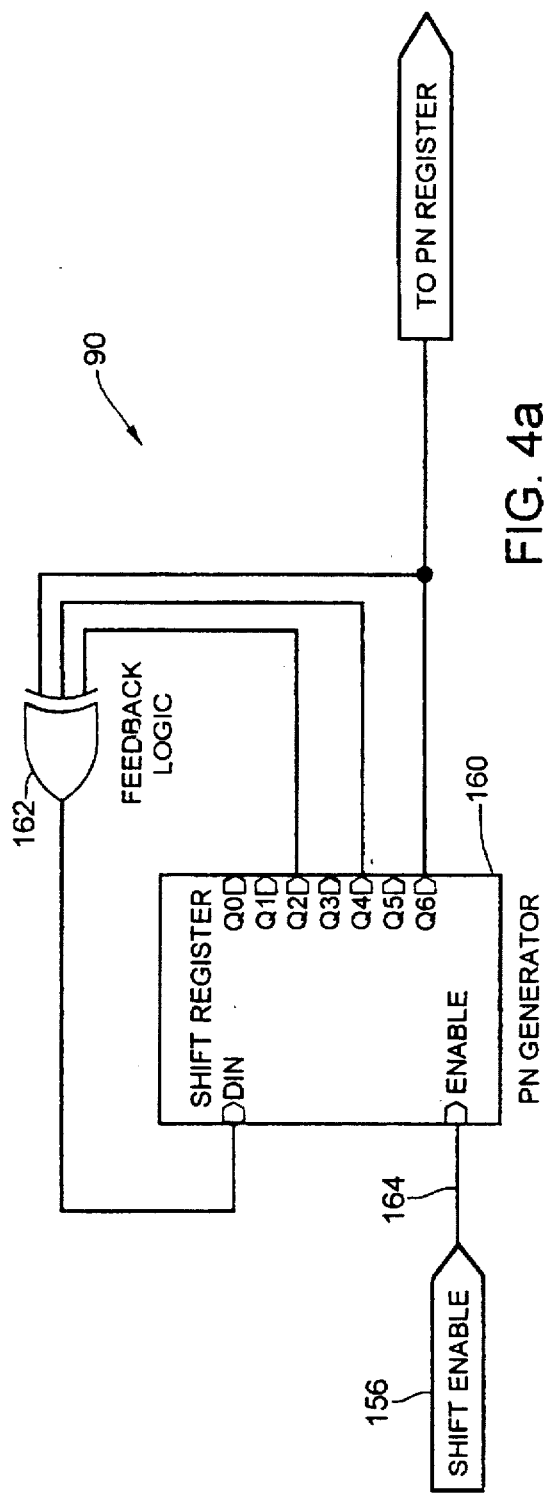
FIGS. 4(a) and 4(b) are schematic diagrams showing in more detail the pn code generator of FIG. 3.
Figure 4B:
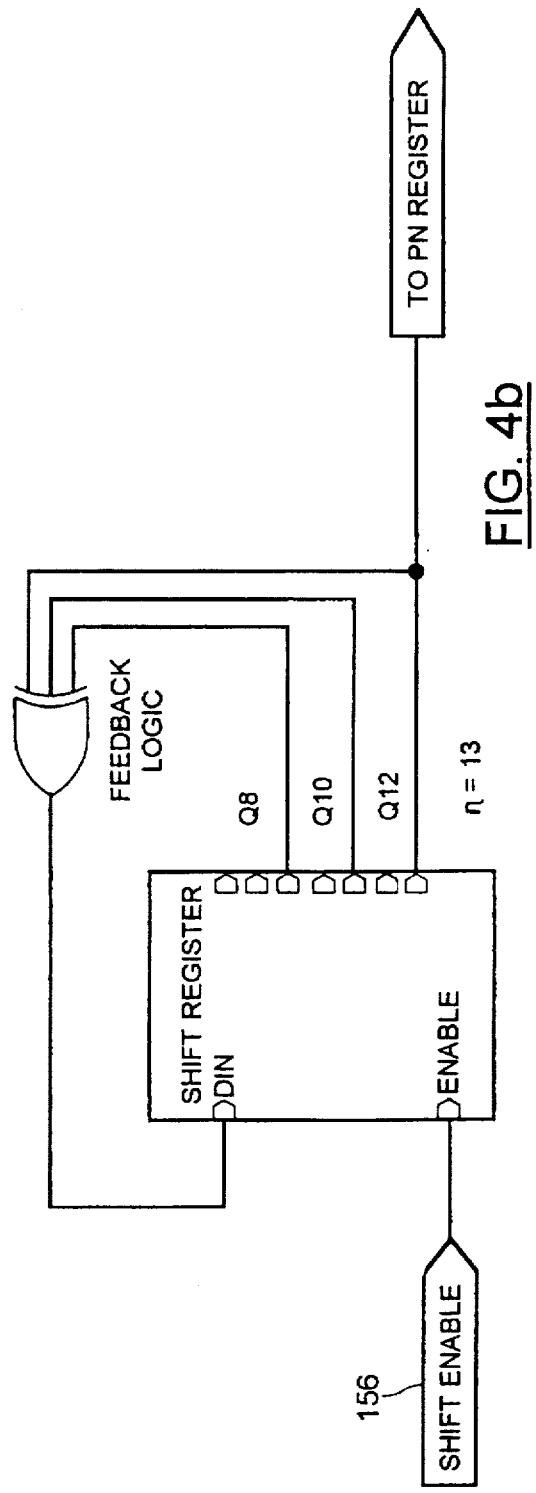

Reference is next made to FIGS. 4(a) and 4(b) which show a circuit for the PN generator 90. As described above, the PN generator 90 generates the PN code 62 and the PN code 62 is a pseudo random digital sequence. As shown in FIG. 4(a), the PN generator 90 can be implemented using a conventional "D-type" shift register 160 and a XOR logic gate 162. The XOR gate 162 provides a feedback logic loop between the input to the shift register 162 and selected output stages, e.g. $Q_2, Q_4$ and $Q_6$, of the shift register 160. It will be understood by one skilled in the art that the configuration for the feedback logic loop is selected to produce a PN code 62 with a pseudo random nature and with a sufficiently long bit length before repeating so that the spectral distribution approximates that of sin x/x as shown in FIGS. 4(a) and 4(b). The shift register 160 also has an ENABLE input 164 which is used to start operation of the shift register 160, i.e. generation of the PN code 62. The ENABLE input 164 is connected to the shift enable signal 156 (FIG. 3). The shift enable signal 156 is generated when a match is found between the RX data stream 154 in the RX data register 96 and the PN code 62 which was loaded in the PN register 92 based on the security code count.

Figure 5:
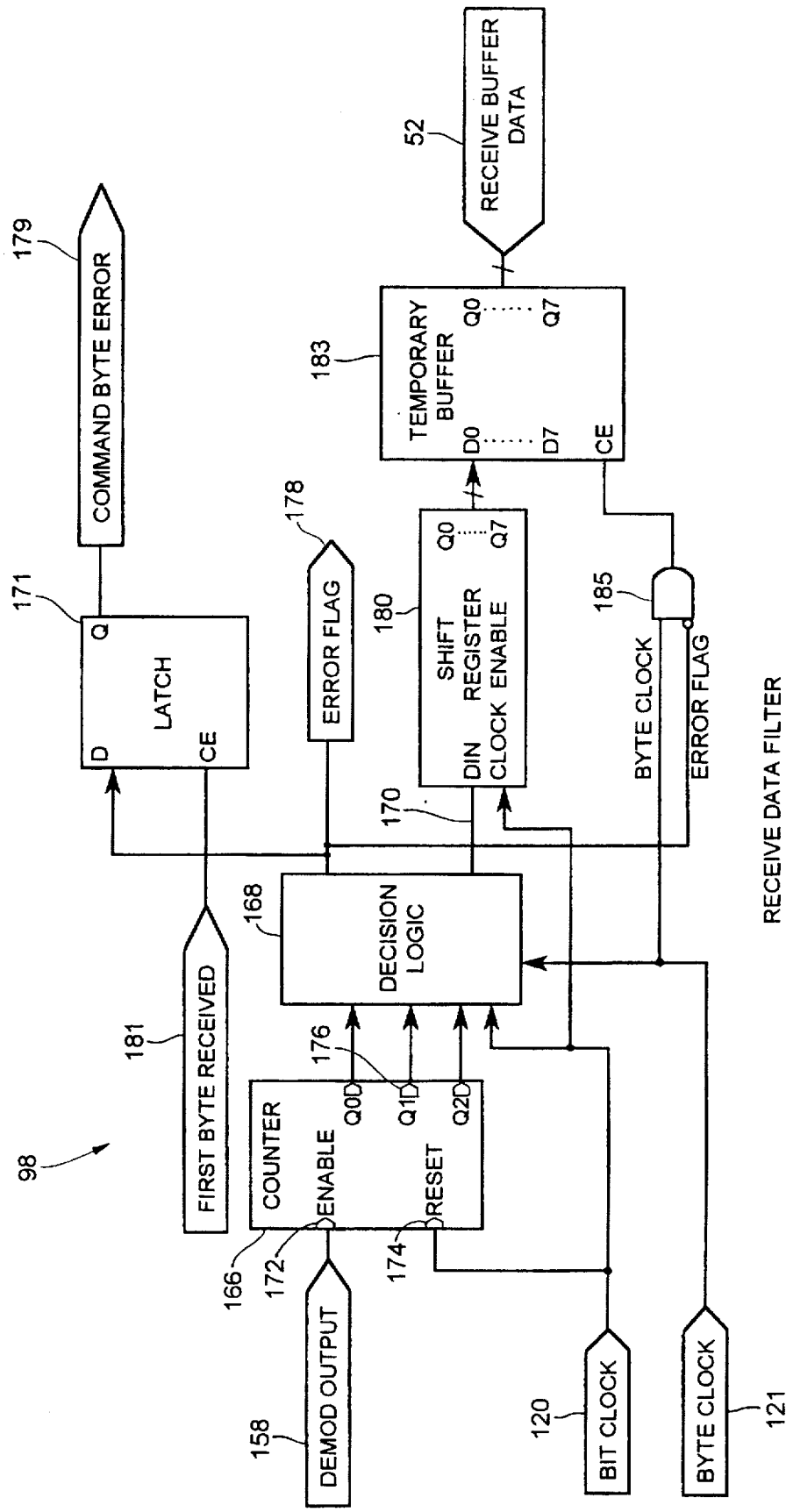
FIG. 5 is a schematic diagram showing in more detail the receive data filter block of FIG. 3.

Reference is next made to FIG. 5 which shows in more detail the receive data filter 98 according to the present invention. The function of the receive data filter 98 is to detect and correct the error bits which may be present in the demodulated receive data stream 158. It is a feature of the present invention that filtering is performed after detection of a signal, i.e. RX Data 154. Because filtering is done after detection, correlation in the receiving unit is not necessary as will be understood by those skilled in the art. This feature can therefore reduce the complexity of RF circuit 42 (FIG. 9).

According to the invention, there is an intentional redundancy in the receive data stream 154. The redundancy is given by the ratio of the PN code 62 rate to incoming data transmit rate. In the present embodiment, a redundancy factor of 10 is used. It will be appreciated that error reduction will increase as the redundancy factor increases.

According to the invention, error reduction is performed on the data stream 158 using an averaging technique. The receive data filter 98 comprises a counter 166, decision logic 168, and an output register 170. The counter 166 has an ENABLE input 172, a RESET input 174 and an output port 176 comprising three bit lines $Q_0, Q_1, Q_2$. As shown in FIG. 5, the demodulated RX data stream 158 controls the ENABLE input 172 and the bit clock signal 120 controls the RESET input 174. The output port 176, i.e. lines $Q_0, Q_1, Q_2$, connect to the decision logic 168 along with the bit clock signal 120 and a byte clock signal 121. The byte clock signal 121 is simply the bit clock signal 120 divided by eight and indicates byte boundaries in the receive data. As shown the decision logic 168 has an error output 178. The error output 178 provides a flag to indicate that an error was detected either in the command byte 114 or in a data byte 116. To distinguish between an error in the command byte 114 and an error in the data byte 116, the receive filter 98 includes a latch 171 which "latches" or stores the error output 178 corresponding to the command byte 114, i.e. first byte in the packet 112. The latch 171 generates a command byte error 179 output when triggered by a first byte received signal which is indicated by reference 181. (It will be remembered that the command byte 114 is the first byte in the packet 112—FIG. 8(a).)

Referring still to FIG. 5, the decision logic 168 includes a data output line 170. The data output line 170 is a serial output for receive data. The output line 170 is coupled to the input of a serial-to-parallel shift register 180. The data appearing on output 170 is shifted in the register 180 by the bit clock 120 and appears on parallel outputs $Q_0$ to $Q_7$. The parallel outputs $Q_0$ to $Q_7$ from the shift register 180 are coupled to the inputs $D_0$ to $D_7$ of a temporary buffer indicated by reference 183. The function of the temporary buffer 183 is to store valid, i.e. error free, command and data bytes, 114,116. As shown, the output $Q_0$ to $Q_7$ is latched into the buffer 183 using the byte clock signal 121 and the error flag signal 178 which are "and'ed" by a logical AND gate 185. If there is an error in a received byte, i.e. command or data byte, the temporary buffer 183 is not updated and the contents of the buffer 183 remain the same, i.e. the last valid byte of data is retained.

The controller 32 reads the command byte error output 179 at the end of a receive cycle to determine if there has been an error in the command byte 114. (The controller 32 can read the command byte error output 179 and error flag output 178 through the control logic 39 (FIG. 1).) If an error is detected in the command byte 114, i.e. the command byte error output 179 is active, the controller 32 will request the transmitting unit (e.g. base station 12) to retransmit the last packet 112 which will include the command byte 114. This operation can be implemented by having the transmitting unit (e.g. base station 12) repeatedly send the last packet until a packet received acknowledgment message is sent by the controller 32 in the receiving unit, e.g. the handset 10.

If an error is detected in one of the data bytes 116 (i.e. the error flag output 178 is active), the last valid data byte is used again through the operation of the temporary buffer 183 and the AND gate 185, i.e. the error flag output 178 suppresses the update of the buffer 183, as described above. The contents of the temporary buffer 183, corresponding to the previous valid receive data, are simply read and stored in the next available location in the receive buffer or stack 46. Because the decision logic 168 utilizes an averaging technique (described below), repeating one or more data bytes 116 does not adversely affect performance of the system 1, and therefore a simpler error correction technique can be used.

It will be appreciated that in voice communication applications, e.g. telephony, it is acceptable to repeat one or more voice data bytes without adversely affecting the performance of the system. Moreover, the error detection and reduction feature of the present invention is well-suited for a real-time system such as voice communication. However, in applications other than voice, for example, data communication, such an error correction method may not produce the desired performance. For example, in a wireless modem application, the receive logic 38 would be modified to request retransmission regardless of whether an error is detected in the command byte 114 or data byte 116.

In operation, the demodulated RX data stream 158 is framed by the bit clock 120 to produce a 10 count period for each data bit in the RX data stream 158. With the demodulated RX data stream 158 connected to the ENABLE input 172 and the bit clock 120 controlling the RESET input 174, the counter 166 will sample or count the number of "1's" in a RX data bit over the 10 count period. The number of "1's" counted appears on the counter outputs $Q_0$, $Q_1$, $Q_2$ which are connected to the decision logic 168.

The decision logic 168 uses the counter output $Q_0$, $Q_1$, $Q_2$ to determine if the RX data bit is either HIGH, LOW or invalid. For the 10 count period, the decision logic 168 sets the valid data output 180 to HIGH, if 7 to 10 samples are logic 1, i.e. $Q_2$, $Q_1$, $Q_0$ are all HIGH. If 0 to 3 samples are logic one, i.e. $Q_0$, $Q_1$, $Q_2$ is binary 011 or less, the decision logic 168 determines the RX data bit to be logic zero and pulls the data output 180 LOW. Each valid data bit appearing on the output 170 is "shifted" into the shift register 180 using the bit clock signal 120. On the eighth data bit, the byte clock 121 loads the contents of the shift register 180 into the temporary buffer 183 and the error flag 178 is also reset in the decision logic block 168. On the other hand, if the decision logic 168 receives a count of 4 to 6, then a loss of correlation is assumed and the error output 178 is set, e.g. pulled HIGH, and loading of the contents of the shift register 180 into the temporary buffer 183 is blocked.

As described, if an error is detected in a received data byte 116 (FIG. 8(a)) in a packet 112 (FIG. 8(a)), the data byte 116 is ignored and the preceding valid data byte is used twice and operation continues. Since a packet 112 will typically contain 86 bytes, a few bad bytes will not have a substantial effect on the performance of a voice communication system. The number bad data bytes 116 can be tracked by the controller 32 through the error flag output 178 and if an unacceptable number of bad data bytes 116 are received, for example, due to a loss of synchronization between the receiving and transmitting units, the system 1 can go into a recovery mode under program control.

It will be appreciated that the RX data filter 98 according to the present invention provides a convenient technique to filter noise and provide error correction by averaging the data bits in the RX data stream 158. In addition, the RX data filter 98 can provide a loss of synchronization indication through the data error output 178. For the receive data filter according to the present invention as shown in FIG. 5, it has been found that using a discrete binomial distribution to approximate the error distribution, the incoming error rate of 5% is reduced to 0.1%. It will therefore be appreciated that the present invention provides an inexpensive and simple error reduction technique over conventional Digital Signal Processing techniques.

Figure 6:
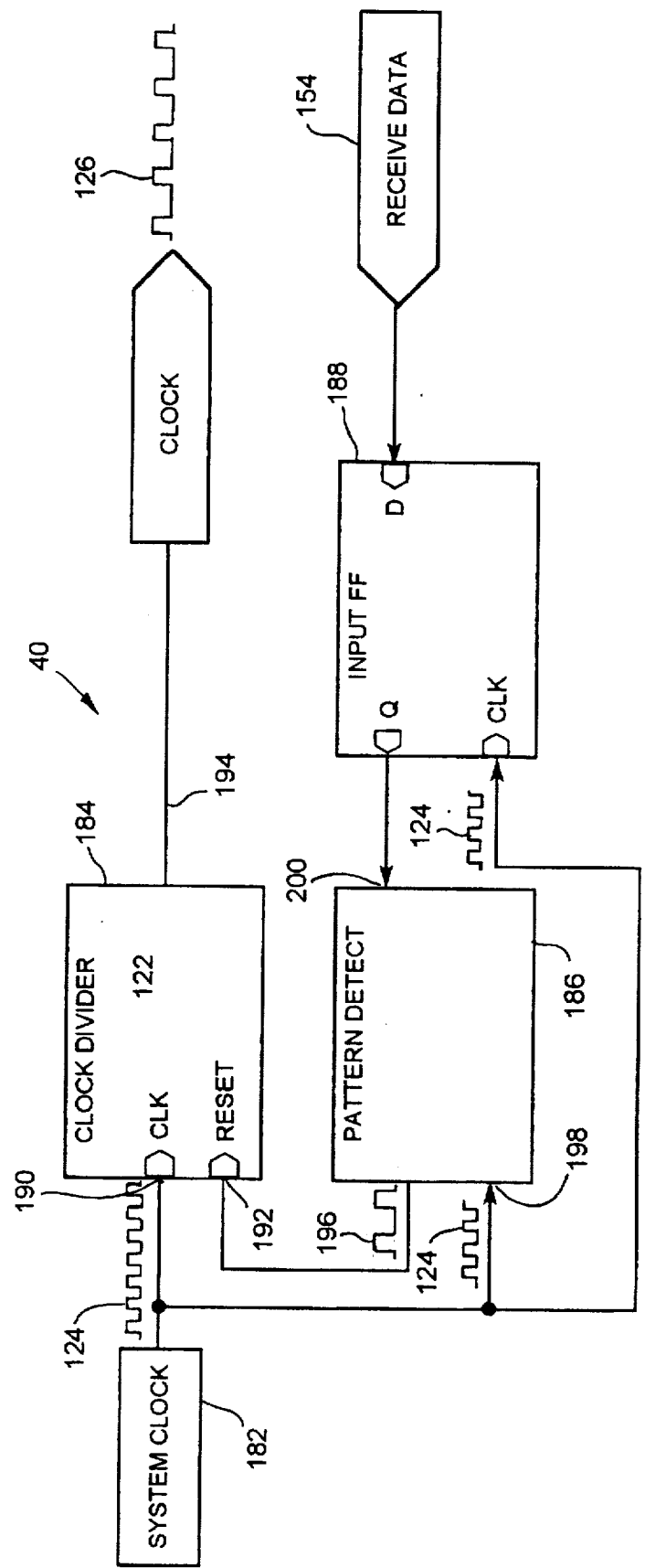
FIG. 6 is a schematic diagram showing in more detail the clock generator block of FIG. 1.
Figure 8B:
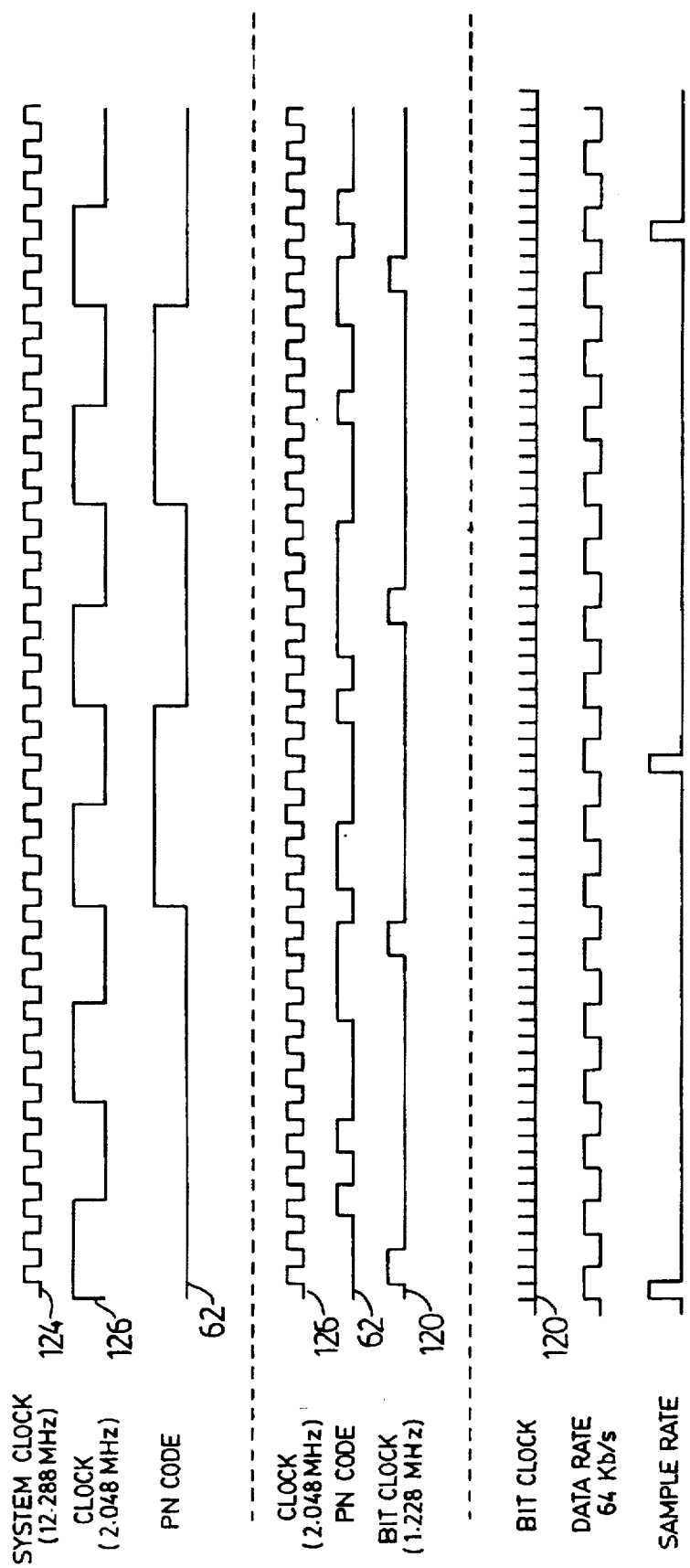

Reference is next made to FIG. 6 which shows the clock generator 40 according to the present invention. The clock generator 40 provides two principal functions. The first is to generate a system clock signal 124 (FIG. 8(b)) and a clock signal 126 (FIG. 8(b)). The system clock 124 is the master clock signal which provides the timing for the system 1. The clock signal 126 is derived from the system clock 124. The second function of the clock generator 40 is to synchronize the clock signal 126 to the incoming RX data stream 154. To synchronize the clock signal 126, the clock generator 40 reconstructs the clock signal 126' of the transmitting unit, e.g. the base unit 12.

It will be understood by those skilled in the art that reliable clock recovery is one of the most important operating aspects of any digital communication system. For reliable data detection by the receiving unit (e.g. the handset 10), the receive logic 38 must follow closely the transmit bit clock rate of the transmitting unit (e.g. the base station 12). If close correspondence is not maintained throughout the entire RX data stream or packet 154, then serious errors can be introduced by the receive demodulator 152 due to synchronization errors between the PN code 62 and the PN code embedded in the RX data stream 154. Normally, small differences will exist in the timing control devices, e.g. crystals, in the handset 10 and base station 12 due to the temperature or production tolerance differences, and these differences are sufficient to cause a loss of synchronization.

As shown in FIG. 6, the clock generator and recovery circuit 40 comprises a system clock generator 182, a clock divider 184, a pattern detector 186 and an input flip-flop 188. The system clock generator 182 produces the system clock signal 124, which in the preferred embodiment has a frequency of 12.288 MHz. The divider 184 divides the system clock 124 by a factor of six to produce the clock signal 126.

As shown in FIG. 6, the clock divider 184 comprises a resettable counter having a CLK input 190, a RESET input 192 and an output 194 for the clock signal 126. The CLK input 190 receives the system clock signal 124 and the RESET input 192 connects to the output of the pattern detector 186. The divider produces the clock signal 126 by dividing the system clock 124, normally at 12.288 MHz, by a factor of 6 to the clock signal 126 with a frequency of 2.048 MHz. To synchronize the clock signal 126 with the incoming RX data stream 154, the pattern detector 186 produces a synchronization signal 196 which is extracted from the incoming RX data stream 154. As shown in FIG. 6, the synchronization signal 196 controls the RESET input 192 of the divider 184.

The pattern detector 186 has a clock input 198 for the system clock 124 and a data input 200 coupled to the output of the flip-flop 188. The flip-flop 188 samples the incoming RX data stream 154 at the frequency, i.e. 12.288 MHz., of the system clock 124 for the data input 200 of the pattern detector 186. The pattern detector 186 includes logic, e.g. a pulse shape detector, (not shown) for discerning a recognizable data pattern in sampled RX data stream from the flip-flop 188. In the preferred embodiment, the actual pattern sought is 00001111, which defines the rising data edge of a data bit in the packet 112 (FIG. 8(a)). When the pattern detector 186 finds this pattern in the sampled RX data stream, the synchronization signal 196 is produced for the RESET input 192 of the clock divider 184. The operation of the logic in the pattern detector 186 is timed so that the rising edge of the resultant clock pulse coincides with the peak or middle of the incoming data pulse. This provides more reliable sampling of the incoming data pulses by allowing the clock to be aligned to the middle of a data bit.

Once the packet 112 has been detected, i.e. the compare logic 150 (FIG. 3) has matched the pn code in the RX DATA 154 to the pn code stored in the pn register 92, the signal 196 applied to the RESET input 192 of the clock divider 184 is synchronized to occur either on the first count or the last count. In other words, the signal 196 can reset the clock divider 184 at any time during the duration of training pulses 118 (FIG. 8(a)), and thereafter only on the first count or last count of the clock divider 184. This makes the communication system 1 according to the present invention less susceptable to false triggering during data reception, but fast locking during the training pulse period.

It is a feature of the invention that the resolution for the pattern detector 186 (and clock recovery circuit 40) is set by the number of samples per bit. This feature makes the synchronizing function of the clock circuit 40 less susceptible to noise and allows the clock recovery circuit 40 to lock on the first recognized rising edge, i.e. 01. It will be appreciated that the clock generator and recovery circuit 40 according to the present invention provides fast locking and error tolerant clock recovery without the need for a lengthy preamble in the RX data stream 154. In a practical system this provides an effective cost solution because it avoids the use of a fast acquisition and locking phase locked loop (PLL).

It will be evident to those skilled in the art that other embodiments of the invention fall within its spirit and scope as defined by the following claims.

I claim:

1. An apparatus for two-way wireless digital communication, said apparatus comprising:
   (a) input means for inputting an information signal;
   (b) means for generating a pseudo-random signal;
   (c) means for modulating said information signal with said pseudo-random signal to produce an encoded packet, said encoded packet having a start bit and said start bit being defined by a preselected bit position in said pseudo-random signal;
   (d) means for inserting a training pulse segment preceding each encoded packet;
   (e) transmitter means for transmitting said encoded packet preceded by said training pulse segment to a remote receiver, said transmitter means being operational for a transmitting interval;
   (f) receiver means for receiving such an encoded packet preceded by such a training pulse segment from a remote transmitter, said receiver means being operational for a receiving interval;
   (g) means for setting the preselected bit position in said pseudo-random signal wherein;
      (i) said means for setting the preselected bit position comprises counter means for producing a count output signal, storage means for storing a code and means for comparing said count output signal to said code and producing a bit position control signal when said output signal matches said code; and
      (ii) said means for setting the preselected bit position being operational at the start of each transmitting or receiving interval;
   (h) means, operational during said receiving interval, responsive to said code for determining said preselected bit position in said pseudo-random signal and producing a demodulating control signal; and
   (i) means, operational during said receiving interval, for recovering such an information signal from such an encoded packet, said means for recovering having means responsive to said demodulating control signal for separating said pseudo-random signal from such an information signal to produce such an original information signal.

2. The apparatus as claimed in claim 1 further including means for receiving said code from an external source, said means for receiving said code comprising an input port located in said apparatus and adapted to couple to an output port located on said external source and said external source having means for outputting said code to said output port and said means for receiving having means for inputting said code from said input port.

3. The apparatus as claimed in claim 1 further including clock recovery means for recovering a clock signal from said packet, said clock recovery means comprising:
   (a) an input for receiving said encoded packet preceded by such a training pulse segment;
   (b) means for synchronizing said receiving means to such a training pulse segment;
   (c) pattern detect means for detecting a predetermined pattern in said encoded packet and said pattern detect means including means for producing a clock control signal when said predetermined pattern is detected in said encoded packet; and
   (d) means responsive to said clock control signal for producing a clock signal synchronized with said encoded packet.

4. The apparatus as claimed in claims 1, 2 or 3, where the apparatus is a cordless digital telephone or modem.

5. A method for two-way wireless communication comprising the steps of:
   (a) inputting an information signal;
   (b) generating a pseudo-random signal;
   (c) modulating said information signal with said pseudo-random signal to produce an encoded packet, said encoded packet having a start bit defined by a preselected bit position in said pseudo-random signal;
   (d) inserting a training pulse segment at the start of each encoded packet;
   (e) transmitting said encoded packet preceded by said training pulse segment to a remote receiver during a transmitting interval;
   (f) receiving such an encoded packet preceded by such a training pulse segment from a remote transmitter during a receiving interval;
   (g) setting a preselected bit position in said pseudo-random signal wherein;
      (i) a count output signal is produced and compared with a stored code to produce a bit position control signal when said count output signal matches said code; and
      (ii) the preselected bit position is set at the start of each transmitting or receiving interval;
   (h) using said code, during said receiving interval, to determine said preselected bit position in said pseudo-random signal and producing a demodulating control signal; and
   (i) recovering, during said receiving interval, such an information signal from such an encoded packet using said demodulating control signal to separate said pseudo-random signal from such an information signal to produce such an original information signal.

6. The method as claimed in claim 5 further including the step of receiving said code from an external source, said code being received by coupling an input port located on said apparatus to the output port of said external source.

7. The method as claimed in claim 5 further comprising the steps of:
   (a) receiving an encoded packet preceded by such a training pulse segment;
   (b) synchronizing the receiving circuit to such a training pulse segment;
   (c) detecting a predetermined pattern in said encoded packet and producing a clock control signal when said predetermined pattern is detected in said encoded packet; and
   (d) producing a clock signal synchronized with said encoded packet in response to said clock control signal.

8. The method as claimed in claims 5, 6 or 7, where the method is for two-way wireless communication over a cordless digital telephone or modem.

* * * * *